Oct. 12, 1965 S. W. SOOS, JR 3,211,955
CIRCUIT INTERRUPTING DEVICE
Filed March 29, 1960 5 Sheets-Sheet 1
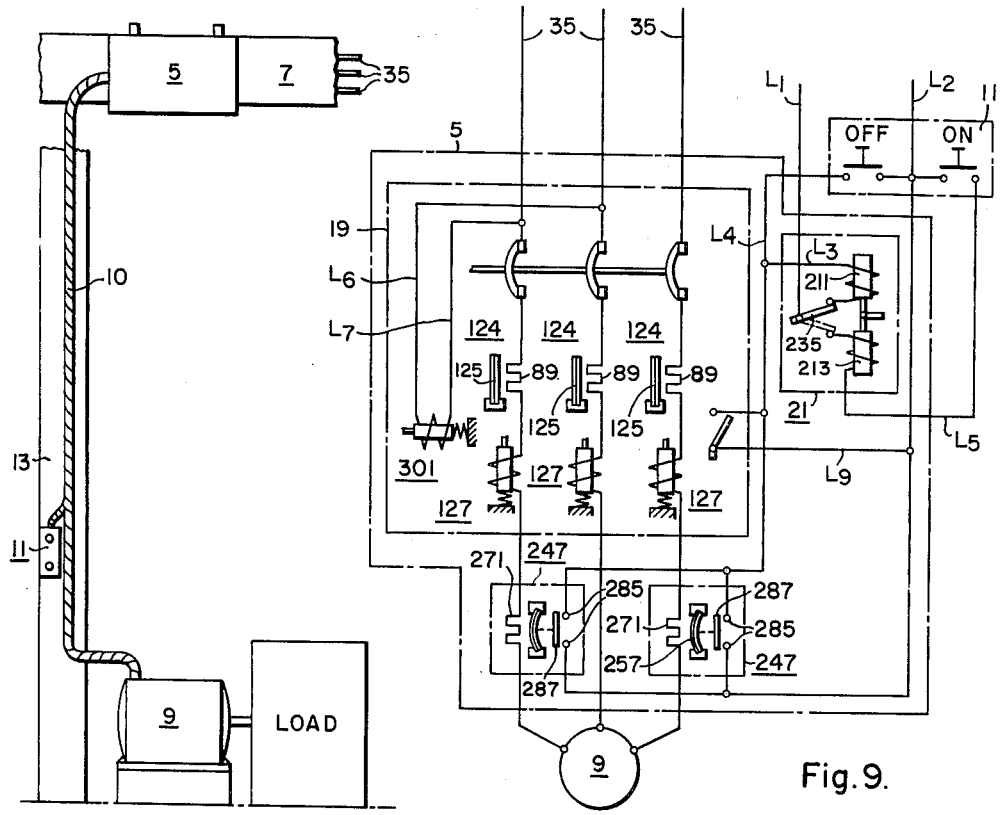
Fig. 1.
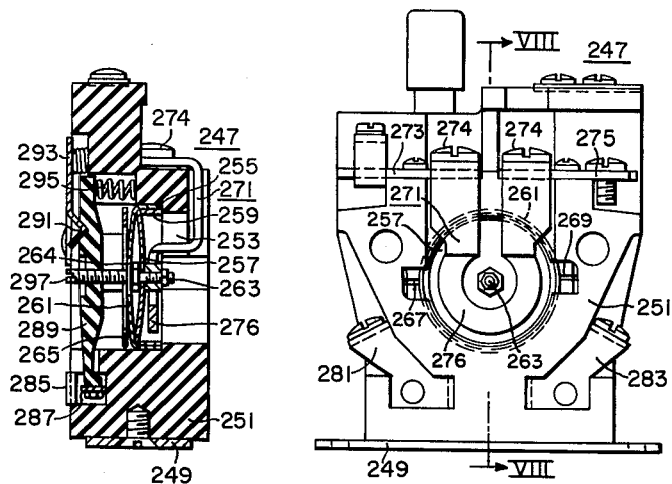
Fig. 8.
Fig. 7

Oct. 12, 1965  S. W. SOOS, JR  3,211,955
CIRCUIT INTERRUPTING DEVICE
Filed March 29, 1960  5 Sheets-Sheet 2

Oct. 12, 1965    S. W. SOOS, JR    3,211,955
CIRCUIT INTERRUPTING DEVICE
Filed March 29, 1960    5 Sheets-Sheet 3

United States Patent Office 3,211,955
Patented Oct. 12, 1965

1

3,211,955
CIRCUIT INTERRUPTING DEVICE
Steven W. Soos, Jr., Brecksville, Ohio, assignor to Westinghouse Electric Corporation, East Pittsburgh, Pa., a corporation of Pennsylvania
Filed Mar. 29, 1960, Ser. No. 18,427
11 Claims. (Cl. 317—13)

This invention relates to electric apparatus, and more particularly to remotely controlled bus duct plug-in units. The invention also relates to motor-control units which include circuit interrupters for branch circuit protection and operating means controlled by overload relays to operate the circuit interrupters for additional motor protection.

This application is a continuation-in-part of the copending patent application of Steven W. Soos, Jr., Serial No. 848,148, filed October 22, 1959, and assigned to the assignee of the present application.

Bus duct in a building is generally located near the ceiling where it is out of the way. Plug-in units are generally mounted on the bus duct in order to tap power off of the duct to run motors for various types of manufacturing operations. Each of these plug-in units includes a circuit interrupter to protect the branch circuit from overload currents above a certain amount. An operator, standing on the floor of the building, has in the past, used a hook-stick or a pair of pull-cords in order to manually operate these plug-in-unit circuit interrupters. These devices are unsatisfactory in that both are awkward to handle. Moreover, a hook-stick can easily be misplaced or lost, and pull-cords are often in the way when not being used.

Accordingly, it is an object of this invention to provide improved means for remotely controlling the operation of a circuit interrupter which is part of a bus duct plug-in unit that is mounted to tap power off of bus duct.

In the past, the control and protection of electric motors have required, in most instances, two different types of circuit interrupting devices, namely, a circuit breaker for branch circuit protection and a contactor or motor starter for motor protection and control. This type of circuit protection and motor control is still in general use. For some applications, however, when frequent circuit interruption is not required, the expense of a contactor is not warranted, and a circuit breaker alone can be used for branch-circuit and motor protection and for motor control. In these cases, the circuit breakers, to have practical utility, must have sensitive and relatively fine adjustable low-current trip devices in order to be able to protect motors of different ratings. Manual motor starters have been provided with interchangeable heaters for adjusting the thermal tripping operation. These devices are presently being used for motor control. The structures of many types of circuit breakers, however, prohibit the use of interchangeable heaters, and when these breakers were used in the past for branch circuit protection, it was necessary to use expensive contactors in combination therewith for motor protection and control.

Accordingly, another object of this invention is to provide an improved combination circuit interrupter and motor control unit which does not include a contactor.

A further object of the invention is to provide a circuit interrupter with improved means for automatically opening the interrupter.

Another object of the invention is to provide a circuit interrupting device having solenoid operating means operable by overload relay means to open a circuit interrupter.

The novel features that are considered characteristic of the invention are set forth in particular in the appended claims. The invention itself, however, both as to structure and operation, together with additional objects and advantages thereof, will be best understood from the following detailed description of one form thereof when read in conjunction with the accompanying drawings.

In said drawings:

FIGURE 1 is a pictorial view of the remotely controlled bus duct plug-in unit of this invention connected to tap current off of the bus duct in order to control an electric motor.

FIG. 7 is an elevational view, on an enlarged scale of one of the overload relays shown in FIG. 2.

FIG. 8 is a sectional view taken along line VIII—VIII of FIG. 7.

FIG. 9 is a diagrammatic view of the circuit of the overload protecting device of this invention.

Figure 2:
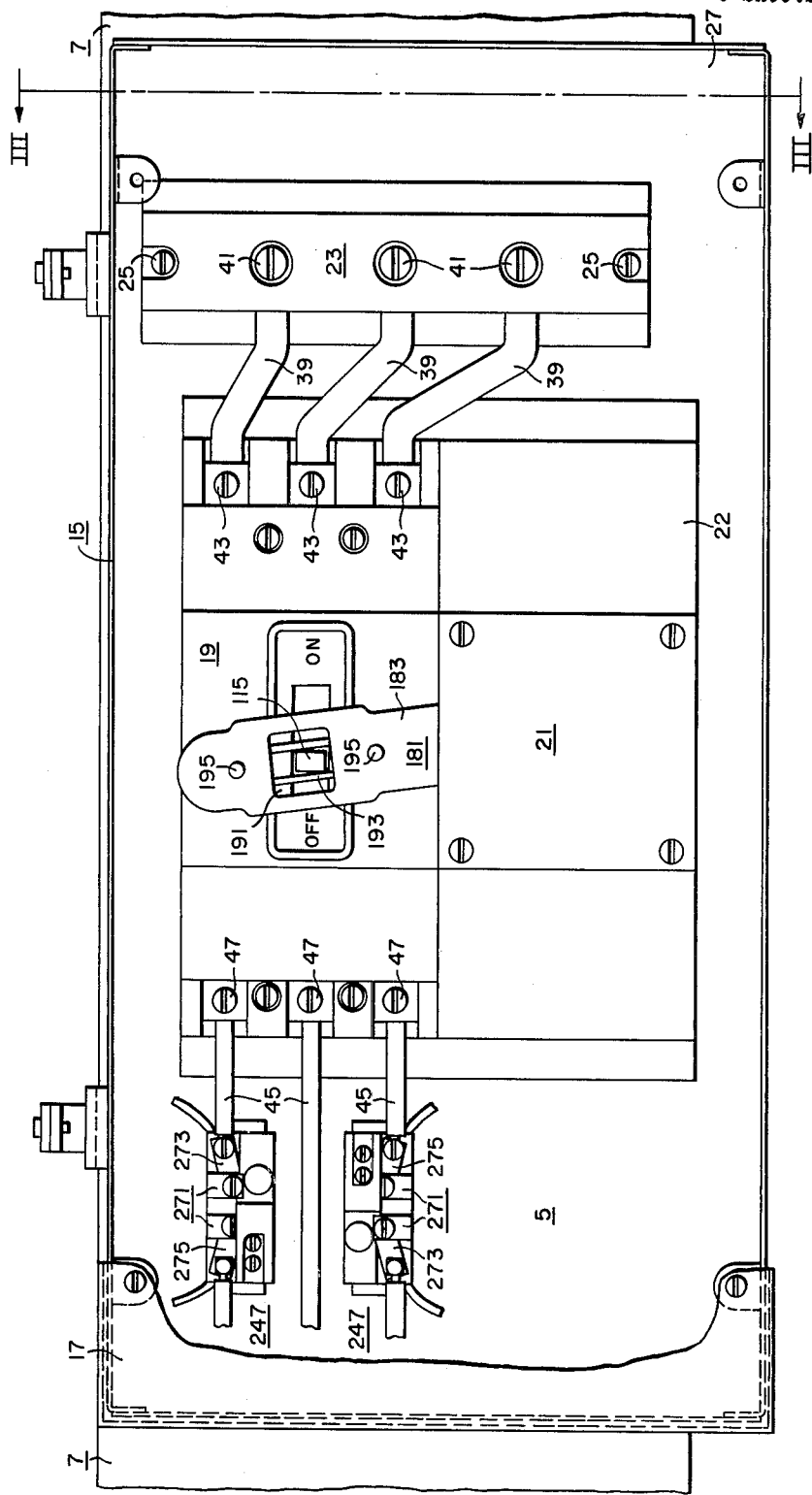
FIG. 2 is an elevational view, on an enlarged scale and partly in section, of the plug-in unit and part of the bus duct shown in FIG. 1.
Figure 5:
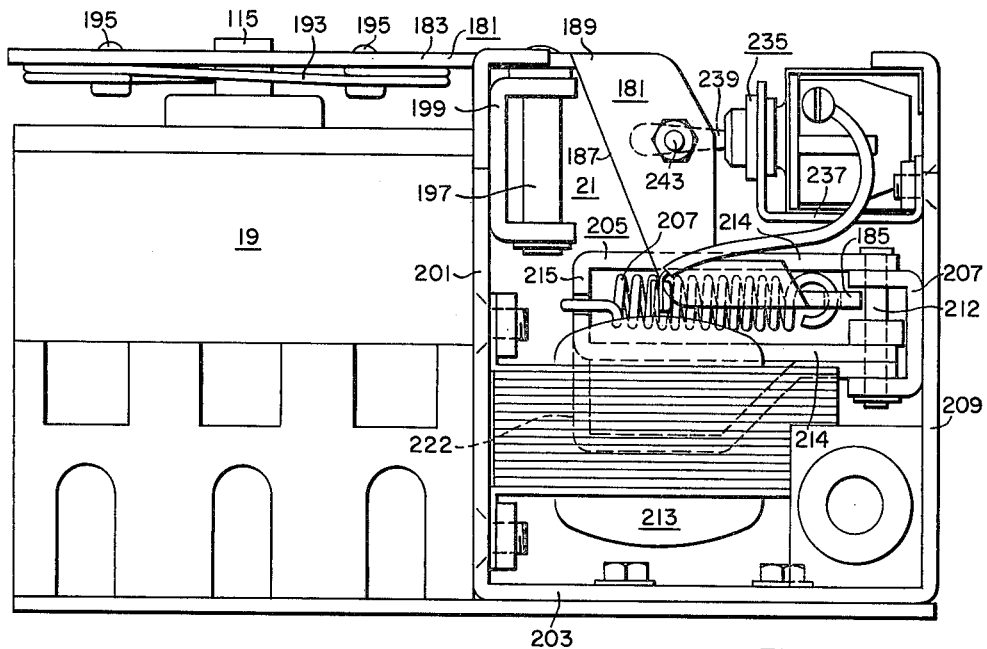
FIG. 5 is a view taken along line V—V of FIG. 4.

Referring to FIG. 1 of the drawings, a plug-in unit indicated generally at 5 is supported on a section of bus duct indicated generally at 7 for tapping power off of the bus duct to operate an electric motor 9, which, in turn, operates a suitable load. The plug-in unit 5 and motor 9 are electrically connected by means of an electrical cable 10. A push-button unit 11, supported on a wall or post 13 at a height where it can be easily reached by an operator is provided for remote control of a circuit interrupting device which is part of the plug-in unit 5, which may be on the duct near the ceiling, and which unit will be hereinafter specifically described.

The unit of this invention has been designed particularly for use in the control of a motor circuit, where it has specific advantages, but it is to be understood that other features of the invention such as the remote control of the circuit breaker or switch from a convenient location, have advantages for the control of other types of circuits such as for lighting or heating.

Figure 3:
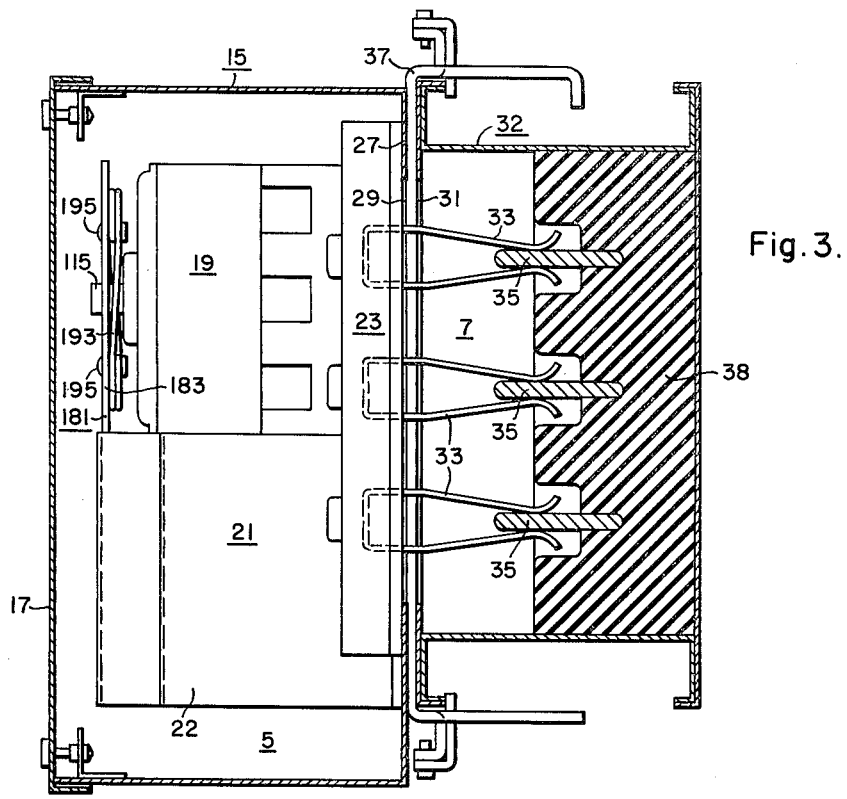
FIG. 3 is a sectional view taken along line III—III of FIG. 2.
Figure 4:
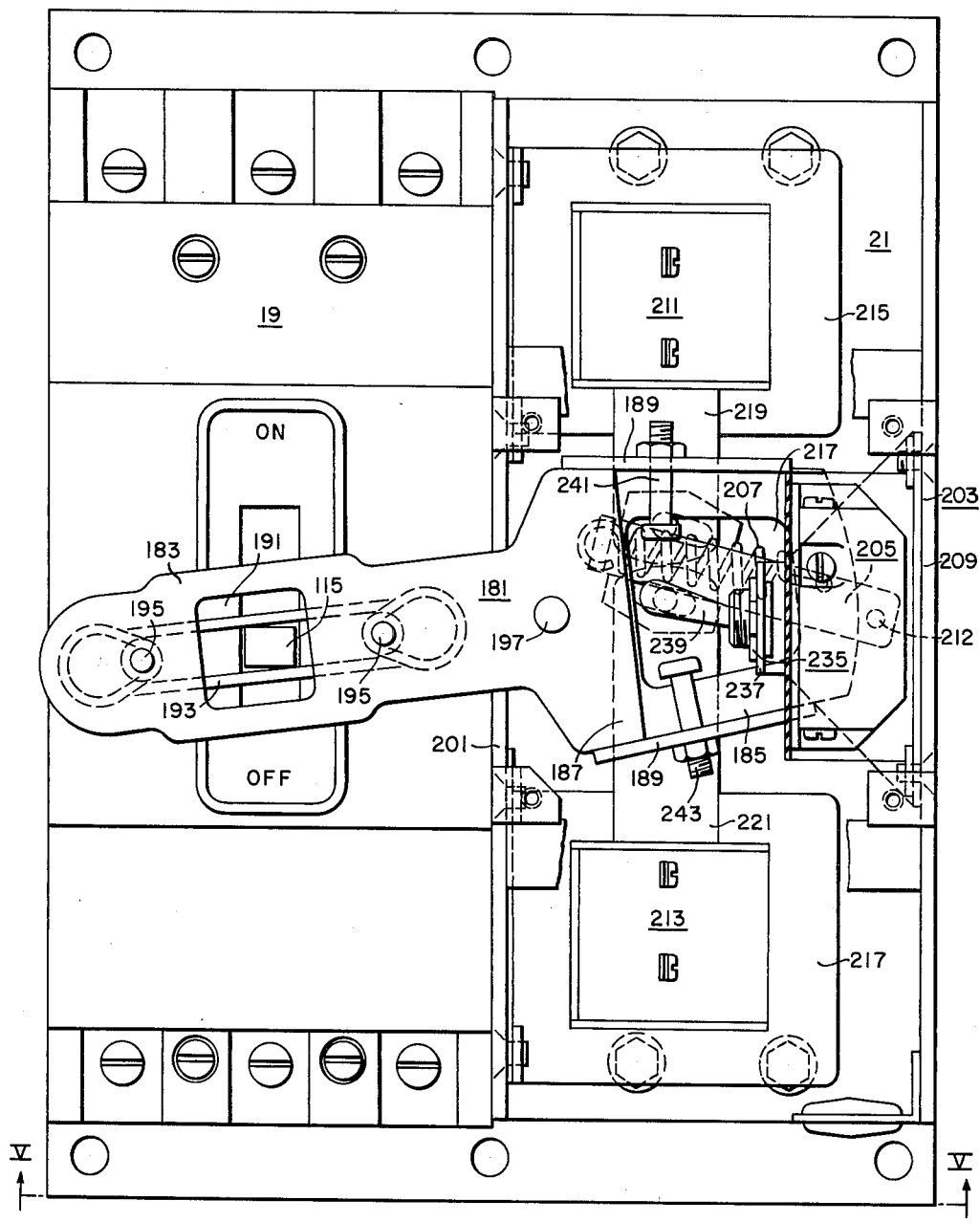
FIG. 4 is an elevational view, on an enlarged scale, of the circuit breaker and solenoid operating means of the plug-in unit, the cover plate being removed from the solenoid operating means.

As illustrated in FIG. 2, the plug-in unit 5 includes an enclosure indicated generally at 15 having an openable cover 17. A circuit breaker or switch indicated generally at 19 and an electric operating device indicated generally at 21 are mounted adjacent each other within the enclosure 15. A cover plate 22 (FIGS. 2 and 3) is provided for the operating device 21. An insulating support member 23 is attached by means of two screws 25 to the base 27 of the enclosure 15. The support member 23 fits over an opening 29 (FIG. 3) in the enclosure base 27 which opening is coincident with an opening 31 in a side member of the bus duct housing 32. The openings 29 and 31 allow passage of three clip-on type contact elements or stabs 33 which are supported by the support members 23 and which clip on to three bus bars 35. The bus bars 35 are supported within the bus duct housing 32 by means of a plurality of insulating support members 38 that are staggered on opposite sides of the bars along the length of the duct in a manner well known in the art. As seen in FIG. 3, the housing 32 is of the four-channel interlocking type of construction. The plug-in unit 5 is supported on the housing by two clip members 37 (FIGS. 1 and 3), each of which fits over two channel portions of the bus duct housing 32. The three contact elements 33 are electrically connected to the three pole units of the circuit breaker 19 by three flexible strap conductors 39 (FIG. 2) which are connected at one end to the contact elements by three screws 41 and at the other end to the circuit breaker line terminals by three screws 43. Three conductors 45 are connected to the load terminals of the circuit interrupter by three screws 47. The conductors 45 are wrapped in a common insulating cover to form the electrical cable 10 (FIG. 1) which electrically connects the plug-in unit to the load. Two overload relays indicated generally at 247 (FIG. 2), which will be hereinafter specifically described, are connected to the outside conductors 45.

The circuit from the bus bars 35 (FIG. 3) extends through the stab contact elements 33, flexible conducting straps 39 (FIG. 2), circuit breaker 19, conductors 45 (the outside phases going through the overload relays 247), electrical cable 10 (FIG. 1) and the motor 9. The push-button control unit 11 is electrically connected to the circuit in a manner which will be hereinafter specifically described.

Figure 6:
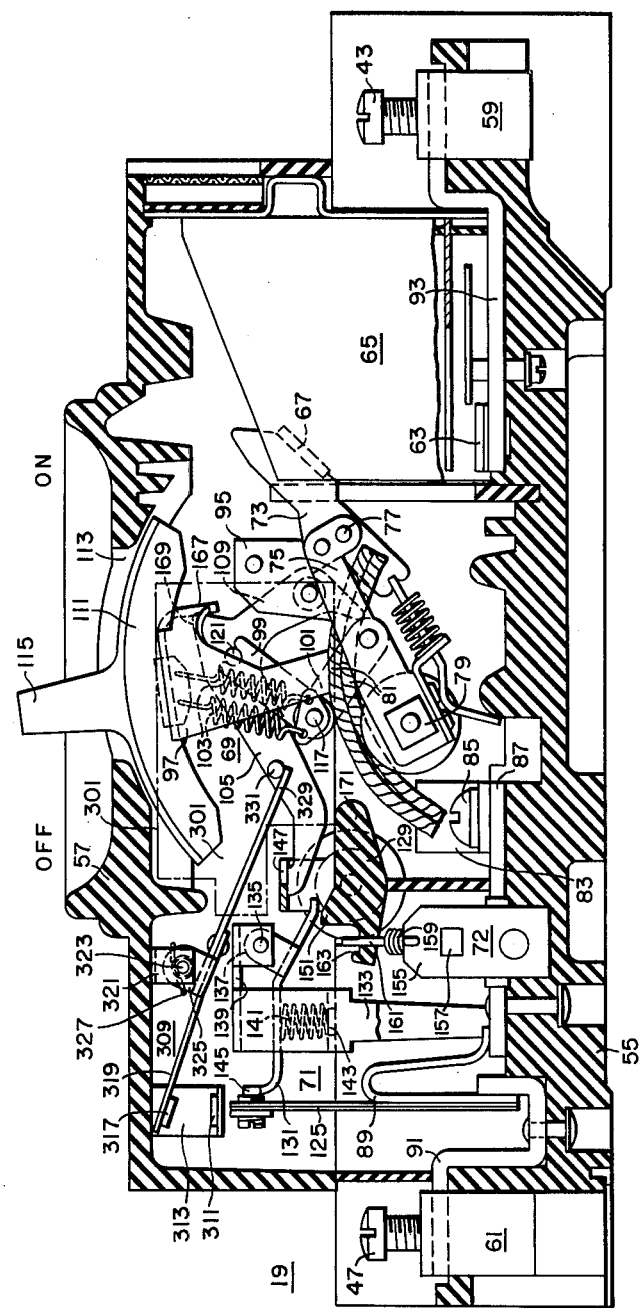
FIG. 6 is a sectional view, on an enlarged scale, of the circuit breaker of this invention.

Referring to FIG. 6, the circuit breaker shown therein is of the general type described and claimed in the patent to H. D. Dorfman et al., Patent No. 2,458,151, titled "Circuit Breaker," issued January 4, 1949, and assigned to the assignee of the instant application.

The circuit breaker includes a base 55 of molded insulating material on which the elements of the breaker mechanism are mounted. A cover 57 also of molded insulating material is removably secured to the base and cooperates therewith to form an enclosing housing for the breaker mechanism.

The circuit breaker is of the multipole type, each pole comprising a line terminal 59 and a load terminal 61 disposed at opposite ends of the breaker, a stationary contact 63, an arc extinguisher 65, and a movable contact 67. A common operating mechanism indicated generally at 69 is provided for simultaneously actuating the three movable contacts to open or close the breaker. A trip device, which includes a thermal trip device indicated generally at 71 and a magnetic trip device indicated generally at 72, is provided to effect automatic opening of the three sets of contacts in response to predetermined overload conditions in the circuit through any pole unit of the breaker.

Each of the movable contacts 67 is mounted on a contact arm 73 pivotally supported intermediate its ends on the free end of a pair of switch arms 75 by means of a pivot pin 77. The arms 75 for all of the pole units are mounted on a rectangular tie bar 79 of insulating material so that the tie bar and all of the switch arms 75 will rotate as a unit, the tie bar being pivotally supported in the side walls of the circuit breaker housing.

Flexible shunt conductors 81 connect the contact arm 73 with an angular terminal 83 secured by a screw 85 to one end of a conductor 87. The other end of the conductor 87 is connected to one end of a looped heater conductor 89 the other end of which is connected to a terminal conductor 91 that is connected at its outer end to the load terminal 61. Each of the stationary contacts 63 is mounted on the inner end of a conductor 93 having its outer ends connected to the line terminal 59.

The electrical circuit for each of the pole units is essentially the same and extends from the line terminal 59 through the conductor 93, stationary contact 63, movable contact 67, contact arm 73, flexible shunt conductors 81, terminal 83, conductor 87, looped heater conductor 89, conductor 91, to the load terminal 61.

The operating mechanism for the breaker illustrated generally at 69, is disposed in the compartment housing the center pole unit and is supported on a pair of frames 95 secured to the center part of the base 55. The operating mechanism includes a forked operating lever 97, a toggle comprising links 99 and 101, four overcenter springs 103 (only two of which are shown in FIG. 6) and a releasable cradle 105 controlled by the trip device 71, 72. The cradle 105 is pivotally supported on the frame 95 by a pivot pin 109. The inner ends of the forked operating lever 97 are rounded and are pivotally seated in recesses (not shown) in the frames 95. An insulating shield 111 for covering an opening 113 in the cover 57 is mounted on the outer end of the operating lever 97, and a manual operating handle 115 integral with the shield projects through the opening 113 to permit manual operation of the breaker mechanism. The toggle links 99 and 101 are pivotally connected together by a knee pin 117. The link 101 is pivotally connected by a pivot pin 119 to the pair of switch arms 75 for the center pole unit, and an end of the link 99 is bifurcated and pivotally engages a stud 121 on the cradle 105, being retained in engagement therewith by the tension exerted by the overcenter springs 103 between the knee pin 117 and the outer end of the operating lever 97.

The thermal trip device 71 includes a bimetal element 125 which is attached at one end to one leg of the looped heater conductor 89. A trip bar 129 common to all of the pole units is provided for effecting the automatic tripping operations. The trip bar 129 is of one-piece molded insulating material and is pivotally supported by means of pins which are molded in axial alignment in the ends of the trip bar and which rotatably support the bar in bearings in the side walls of the circuit breaker housing.

Each pole unit of the circut breaker is provided with a trip member 131 pivotally supported on a U-shaped frame 133 by a pivot pin 135. The frame 133 of each pole unit is suitably secured to the base 55 and is separate from the frames 133 of the other pole units. The pivot pin 135 which supports the trip member 131 is mounted in a pair of ears 137 formed on a projection 139 of the support member 133. A spring 141 compressed between a bar 143, supported in openings in the legs of the frame 133 and the trip member 131, biases the trip member in a clockwise or tripping direction. The trip member 131 is normally prevented from rotating clockwise by engagement of the latched end thereof with a latch 145 on the free end of the bimetal 125.

A latch member 147 secured to the trip bar 129 normally engages the latched end of the cradle 105 and thereby restrains the cradle in operative position.

When the bimetal element 125 for any pole unit is heated a predetermined amount in response to an overload current, it flexes in a direction to move the free end thereof toward the left as viewed in FIG. 6, and after a time delay unlatches the trip member 131, whereupon the spring 141 rocks the trip member in a clockwise direction. During this movement, the end of the trip member 131 which is disposed above the trip bar 129 strikes a projection 151 molded integral with the trip bar and rocks the trip bar counterclockwise causing the latch 147 to release the cradle 105. This permits the overcenter springs 103 to actuate the operating mechanism and open the contacts in a manner to be hereinafter described.

The electromagnetic trip device indicated generally at 72 is provided to instantaneously trip the breaker upon the occurrence of a heavy overload or short-circuit current in any pole unit of the breaker. For this purpose, each pole unit of the breaker is provided with an electromagnet which includes a U-shaped core member (not shown) disposed within a U-shaped magnet frame 155. Although the core member is not shown, it can be understood that this member is disposed with the free ends of its legs extending upwardly and in such a position that the conducting member 87, as shown in FIG. 6, passes through the opening defined by the legs of the U-shaped core member. An armature, only the pivot of which is shown at 157, is pivotally disposed on one leg of the U-shaped core member. A spring 159 having one end connected to the magnet frame 155 and the other end connected to an actuating member 161 which is attached to the armature, biases the armature to its unattracted position. Upon the occurrence of an overload current in excess of a predetermined magnitude or a short circuit, the armature is attracted to the magnet yoke and the actuating member 161 is rotated to engage a projection 163 on the trip bar 129 to rotate the trip bar in a counterclockwise direction as viewed in FIG. 6 to thereby unlatch the cradle 105 to effect a tripping operation of the circuit breaker.

It can be understood that current can travel through the conductor 87 to effect either a thermal or a magnetic tripping operation only when the contacts of the breaker are in the closed position. When the circuit breaker is closed and the trip bar 129 is rocked in unlatching direction in response to an overload in the circuit through any one of the pole units, the cradle 105 is released and it rotates around its pivot 109 under the bias of the overcenter spring 103 to cause collapse of the toggle 99, 101 and opening of the contacts in a well-known manner. The operating mechanism 69 is trip-free, and the breaker will trip even though the handle 115 is held in the closed position.

Following each automatic tripping operation of the breaker, it is necessary to reset the mechanism to operative condition before the contacts can be reclosed. This is effected by rotating the handle 115 from its closed or "ON" position to its extreme open or "OFF" position. This movement of the handle is transmitted to the cradle 105 by a hooked projection 167 which engages a portion 169 of the cradle 105. As the cradle 105 is rotated in a counterclockwise direction, the latch end thereof passes the latch member 147 and engages a projection 171 molded integral with the trip bar 129, rocking the trip bar clockwise slightly past its normal position to relatch the cradle 105. During the clockwise resetting movement of the trip bar 129, the projections 151 thereon engage the ends of the trip members 131 and rock said members counterclockwise to relatch them with the latches 145 on the bimetal elements 125. The mechanism is shown in the relatched position in FIG. 6.

After the cradle 105 has been relatched, the contacts can be closed manually by moving the handle 115 clockwise to its closed position. During this movement, the line of action of the overcenter springs 103 carries the pivot 117 of the toggle 99, 101 to the right to straighten the toggle and effect closing of the contacts with a snap action in a manner well known in the art. The contacts are opened manually by moving the handle 115 in a counterclockwise direction to its open position. This movement carries the pivot 117 of the toggle 99, 101 to the left to cause collapse of the toggle with a snap action, and opening of the contacts to the position shown in FIG. 6.

The circuit breaker handle 115 is operated to open and close the breaker by means of an operating device 21 (FIGS. 2, 3, 4 and 5) which is of the same general type as that described and claimed in the aforesaid copending patent application of Steven W. Soos, Jr.

The operating device 21 includes an operating lever indicated generally at 181 comprising two flat portions 183 and 185 (FIGS. 4 and 5) disposed in different planes and connected by a transverse portion 187 having side walls 189. An opening 191 (FIG. 4) is provided in the portion 183 to receive the circuit breaker handle 115. The portion 183 of the lever 181 is yieldably connected to the breaker handle 115 by means of a resilient wire 193 which is secured to two pins 195 in the portion 183 and which straddles the breaker handle. The lever 181 is pivotally mounted intermediate its ends on a pin 197 which is secured to the lever and which is rotatably mounted in a bracket 199 that is secured to a side wall 201 of a casing 203.

The operating lever 181 is operatively connected to a pair of solenoid devices, which will be hereinafter described, by means of a lever indicated generally at 205 of generally U-shaped configuration. The lever 205 is pivotally connected to a bracket 207 secured to a side wall 209 of the casing 203 by means of a pin 212 that is rotatably supported in the bracket and that passes through an opening in the free end of each of the legs 214 of the U-shaped lever 205. The operating lever 181 and the U-shaped lever 205 are operatively connected by an overcenter spring 207 that is connected at one end to the outer end of the portion 185 of the operating lever 181 and at the other end to base portion 215 of the U-shaped lever 205. It can be seen in FIG. 5 that the spring 207 is disposed between the legs of the U-shaped lever 205, which lever is disposed partially in an opening 217 (FIG. 4) in the lever 181.

In order to effect movement of the operating lever 181, a pair of solenoids 211 and 213 are provided having electroconductive windings 215 and 217, respectively, and plungers 219 and 221 (FIG. 4), respectively. The plungers 219 and 221 are connected to each other to move as a unit, and they are connected to an arm 222 (FIG. 5) that is rigidly attached to the lever 205.

The plungers 219 and 221 are displaced back and forth upon alternate energization of the solenoids 211 and 213 to effect movement of the circuit breaker handle 115 to open and close the breaker 19. The parts are shown in the open circuit position in FIG. 4. In order to close the breaker, the solenoid 213 is energized pulling the plungers 219, 221 down as viewed in FIG. 4, rotating the lever 205 and overcenter spring 207 counterclockwise, whereupon the spring 207 passes through an overcenter position and rotates the lever 181 clockwise about its pivot 197 to move the breaker handle 115 from the "OFF" to the "ON" position to close the breaker. Thereafter, upon energization of the solenoid 211, reverse movements occur, and the breaker handle is moved back to the "OFF" position to open the breaker.

A cut-off switch 235 (FIG. 4) is arranged for operation in response to movement of the operating lever 181 to effect deenergization of the energized solenoid. The switch 235 is positioned to be operated just after the spring 207 passes its overcenter position at which time the lever 181 is snapped to its operating position, by action of the spring, independently of the energized solenoid. The switch 235 is mounted on a bracket 237 which is mounted on the side wall 209 of the casing 203. The switch 235 includes a displaceable switch member 239 which is disposed in the path of movement of heads of a pair of screws 241 and 243 that are secured to the side wall portions 189 of the lever 181. It can be seen in FIG. 4 that the switch member 239 will be displaced between two operating positions by alternate engagement with the heads of the screws 241 and 243 as the lever 181 is moved from one to another operating position. Operation of the switch 235 effects deenergization of the energized solenoid in a manner to be hereinafter described.

The opening solenoid 211 may be energized automatically, to effect opening of the circuit breaker 19, by operation of either of two overload relays of identical construction indicated generally at 247 in FIGS. 2, 7 and 8. Although they may be of any suitable construction, these relays 247 are shown as of the type specifically described and claimed in the patent to G. C. Armstrong et al. Patent No. 2,571,812, titled "Thermostatic Overload Relay" and assigned to the assignee of the instant application. The relays 247 are shown as normally open relays whereas the relay described in the aforementioned patent is a normally closed relay. The structure and operation, however, of each of the relays 247, are essentially the same as that described and claimed in the aforementioned patent.

Each of the relays 247 includes a sheet metal base 249 (FIGS. 7 and 8) to which is attached a body portion 251 of molded insulating material. The body 251 is traversed by a cavity 253 (FIG. 8) having a circular ledge or shoulder 255 against which is seated a thermostatic assembly. This assembly comprises a curved bimetal snap disc 257, a retaining ring 259, a cup 261, and a stud 263 such as a rivet, screw, or bolt. The ring 259 is secured inside the cup 261 which rests against the circular ledge 255 of the cavity 253. When the disc 257 is sufficiently heated, its center will snap toward the left (FIG. 8) and move the head of the stud 263 through an opening 264 in the bottom of the cup 261 toward a contact member to be hereinafter described. The cup-and-disc assembly is secured in the body 251 with the aid of an annular spring member 265 (FIG. 8) which has two diametrically opposite radially projecting lugs 267, 269 (FIG. 7) that engage projections (not shown) of the insulating body 251 to hold the assembly in place. The lugs and projections form a lock which permits insertion of the cup-and-disc assembly and the spring 265 from the left, as viewed in FIG. 8, when the spring is in one angular position, and then fastening the assembly and spring merely by applying pressure to the spring 265 while turning it into locking position.

The bimetal disc 257 is heated indirectly by a heater indicated generally at 271 of resistance material which is attached to two terminals 273 and 275 (FIG. 7) by two screws 274. A loop portion 276 of the heater 271 lies in the cavity 253 of the insulating body 251 close to the bimetal disc 257.

The terminals 273 and 275 of each of the relays 277 are connected in the circuit (FIG. 2). The load current flows through the heater 271 so that the heat produced by the heater is a measure of the current, and the disc will snap if this current exceeds given overload conditions. The heater 271 can be removed merely by loosening the screws 274 (FIGS. 7 and 8) and lifting the heater out to the right as viewed in FIG. 8. The heater 271, therefore, is easily interchangeable for others of different ratings to make the relay applicable for the protection of a wide range of different rated motors.

The switch to be actuated by the thermostatic assembly has two terminals 281 and 283 (FIG. 7) mounted on the body 251 and integral with two stationary contacts 285 (only one being shown in FIG. 8) which cooperate with a contact bridge 287. The bridge 287 is attached to a rigid arm 289 pivotally supported on a V-shaped pivot 291 formed in a sheet metal plate 293 attached to the body 251 by two screws (not shown). A spring 295, disposed between the upper end of the arm 289 and the body 251, biases the arm and contact bridge 287 to the open position shown in FIG. 8. A spacing screw 297 is threaded through the arm 289 and its inner end is engageable by the head of the member 263.

As shown in FIG. 8, the relay is in its normally open position. When, due to an overload current, the heater 271 heats the bimetal disc 257 sufficiently, the bimetal snaps toward the left as viewed in FIG. 8, and the stud 263 engages the screw 297 to move the arm 289 clockwise about the pivot 291 to move the contact bridge 287 towards the contact 285 to close the relay circuit. As will be hereinafter explained, closing of the relay circuit effects opening of the branch circuit which branch circuit is the circuit that energizes the heater 276, so that the bimetal disc 257 being no longer heated when the relay circuit is closed, will cool off and snap back to the normally open position shown in FIG. 8. The arm 289 then returns to the normally open position under the bias of the spring 295.

A schematic circuit diagram of the invention is shown in FIG. 9. As shown therein, the plug-in unit 5 taps power off of the three-phase bus bars 35 to energize the electric motor 9. The plug-in unit includes the circuit breaker 19, electric operating device 21 and overload relays 247 for automatically operating the electric operating device 21 to effect opening of the circuit breaker. The push-button control 11 is provided for remote manual control of the electric operating device 21 to open and close the main circuit through the interrupter 19 at will.

In operation, upon the occurrence of an overload current above, for example, 140% (as will hereinafter be more fully explained) of the normal motor running current in any of the pole units, the circuit breaker thermal trip means 71 in that pole unit will operate to trip the breaker to interrupt the branch motor circuit. The thermal trip means operates with a time delay and is designed so that it will not trip the breaker during the motor-starting period. Upon the occurrence of an overload current above, for example, 1000% of the normal motor running current in any of the pole units, the circuit breaker magnetic trip means 72 will operate to instantaneously trip the breaker to interrupt the motor branch circuit.

The electric operating device 21 is energized through the lines $L_1$ and $L_2$ which are connected across a suitable source of power. As shown in FIG. 9, the circuit breaker 19 is closed and the spring-return "OFF" and "ON" contacts of the push button 11 are both in the open position. In order to manually open the circuit interrupter 19, the "OFF" button of the push button 11 is pressed closing the "OFF" contacts. This closes a circuit from $L_1$ through the switch 235, solenoid 211, line $L_3$, line $L_4$, the "OFF" contacts of the push button 11, and the line $L_2$ thereby energizing the solenoid 211. Energization of the solenoid 211 effects movement of the lever 181 (FIG. 4, for example) to move the circuit breaker handle 115 to its "OFF" position to open the circuit breaker in the same manner hereinbefore described. As the lever 181 moves to the "OFF" position, it operates the cut-off switch 235 to the position shown in dotted lines in FIG. 9 breaking the energized "OFF" circuit to de-energize the solenoid 211.

In order to then close the circuit interrupter 19, the "ON" button of the push button 11 is pressed closing the "ON" contacts. This closes a circuit from $L_1$ through the switch 235, the solenoid 213, line $L_5$, the "ON" contacts of the push button 11 and the line $L_2$ thereby energizing the solenoid 213. Energization of the solenoid 213 effects movement of the lever 181 (FIG. 4, for example) to move the circuit breaker handle 115 to its "ON" position to close the circuit breaker 19. This movement operates the cut-off switch 235 back to the position in which it is shown in full lines in FIG. 9 breaking the energized "ON" circuit to de-energize the solenoid 213.

The operating device 21 is energized automatically, to move the handle 115 (FIG. 4, for example) of the circuit breaker 19 to open the breaker, by operation of either one of the overload relays 247 (FIGS. 2, 7 and 8). Upon the occurrence of an overload current through the branch motor circuit above a predetermined amount, for example 115% of normal motor running current, the bimetal 257 of one of the relays 247 will be heated sufficiently to snap the movable bridging contact 287 to its closed position bridging the stationary contacts 285. This closes a circuit from $L_1$ through the switch 235, solenoid 211, line $L_3$, line $L_4$, the contacts 285 of the closed relay 247, and the line $L_2$ effecting energization of the solenoid 211 and movement of the lever 181 (FIG. 4) to open the breaker in the same manner hereinbefore described. When the circuit breaker opens cutting off current to the heater 271, of the relay 247, the heater cools allowing the bimetal 257 to cool and snap back to the open position. As is well known in the art, the overload relay 247 operates with a time delay and is designed so that it will not operate during the motor-starting period.

As was hereinbefore described, the circuit breaker 19 has a thermal trip device 71 (FIG. 6) and a magnetic trip device 72; and the overload relay 247 (FIGS. 7 and 8) embodies a thermal device that will also effect opening of the breaker. The overload relay 247 will operate with a time delay upon the occurrence of, for example, 115% to 140% of the normal motor running current to effect opening of the circuit breaker. The breaker thermal trip device 71 will operate with a time delay upon the occurrence of, for example, 140% to 1000% of normal motor running current to trip the breaker, and the breaker magnetic trip device 72 will operate instantaneously upon the occurrence of, for example, 1000% and anything over 1000%, of normal motor running current to trip the breaker. Although the bimetal 125 (FIG. 6) will operate to effect a tripping operation of the breaker upon the occurrence of less than 140% of normal motor running current, for example any current greater than 125%, the bimetal 125 operates with a longer time delay than the overload relays 247 (FIG. 7) during the range of 125% to 140% of normal motor running current and the breaker 19, therefore, is opened by operation of one of the overload relays 247 before the bimetal 125 can effect a tripping operation. Since the overload relays 247 operate with a longer time delay than the bimetal 125, upon the occurrence of overload currents greater than 140% of normal motor running current, the bimetal 125 will effect tripping of the breaker when the overload is greater than 140%. The magnetic trip means 72 (FIG. 6) will effect tripping of the breaker upon the occurrence of overloads of 1000% or more of motor-running current because it operates instantaneously before either the breaker thermal trip means 71 or the overload relays 247 have a chance to operate. It can be understood that by the choice of parts, the automatic tripping and opening operations of the circuit breaker can be varied considerably to give desired results. It can also be understood that the thermal trip device 71, could be eliminated from the circuit breaker 19, in which case the overload relays 247 would operate to effect opening of the circuit breaker upon the occurrence of overload currents of for example, from 115% to 1000% of the normal motor running current; the breaker magnetic trip device operating upon the occurrence of an overload of 1000% or more of normal motor running current.

An undervoltage trip device indicated generally at 301 (FIG. 9) may be provided to trip the circuit breaker upon the occurrence of an undervoltage below a predetermined amount. The position of the undervoltage trip device in the circuit breaker is shown in dot-and-dash lines in FIG. 6, and, as can be seen in FIG. 9, two leads $L_6$ and $L_7$ connect the coil of the device across two phases of the circuit through the breaker. The undervoltage trip device 301 is of the type well known in the art comprising an electromagnet having an armature which is held in attracted position when the coil of the electromagnet is energized in response to normal voltage. The armature is released when the voltage on the coil drops below a predetermined value. Upon release of the armature, a plunger attached thereto moves with the armature and strikes the circuit breaker trip bar (in this case, the trip bar 129, FIG. 6) to effect a tripping operation.

As was hereinbefore described, an automatic tripping operation occurs when the trip bar 129 (FIG. 6) is rotated counterclockwise to release the cradle 105 whereupon the cradle rotates clockwise to effect opening of the contacts. Thereafter, the cradle must be relatched before the breaker can be closed. Relatching is effected by movement of the handle 115 to its "OFF" position during which movement the shoulder 167 of the forked lever 97 engages a projection 169 of the cradle 105 rotating the cradle counterclockwise to a position where it is relatched by the portion 147 of the trip bar 129.

An automatically operated switch indicated generally at 309 (FIGS. 6 and 9) is provided to effect relatching of the cradle 105 after a tripping operation. The switch 309 includes a stationary contact 311 supported on a bracket 313. A movable contact 317 is supported on a switch arm 319 which is pivotally supported intermediate its ends on a bracket 321 by a pin 323 which extends through openings in the bracket 321 and in a U-shaped supporting bracket 325 that is secured to the switch arm. A torsion spring 327 biases the switch arm 319 counterclockwise, as viewed in FIG. 6, to its closed position. Counterclockwise movement of the switch arm is restrained, however, by engagement of one end 329 thereof with a pin 331 attached to the cradle 105. Suitable leads $L_8$ and $L_9$ (FIG. 9) are connected to the stationary contact 311 and movable contact 317 respectively.

When a tripping operation of the circuit breaker 19 occurs, the cradle 105 (FIG. 6) rotates clockwise moving the pin 331 out of engagement with the end 329 of the switch arm 319 allowing the switch arm to rotate counterclockwise to close the contacts 311, 317. Closing of the contacts 311, 317, closes a circuit from $L_1$ (FIG. 9) through the switch 235, the solenoid 211, the line $L_3$, the line $L_4$, a line $L_8$, a line $L_9$ and the line $L_2$ to energize the solenoid 211 to automatically effect movement of the breaker handle 115 (FIG. 6) to its "OFF" position. Movement of the breaker handle to its "OFF" position relatches the cradle 105, in the same manner hereinbefore described, thereby preparing the breaker mechanism 69 for a closing operation.

While the device has been illustrated using an automatic circuit breaker having a thermal element, an overcurrent magnetic trip and/or an undervoltage trip built into the breaker, since this gives numerous advantages, it is to be understood that for some applications the automatic trip of the breaker may be eliminated and the device may then be just a switch which would be operated by the electric operator manually by the push buttons or control switch and/or automatically by the overload relays. Short-circuit protection could then be provided by fuses connected in the circuit either at the switch or at some other location.

From the foregoing, it will be understood that there is provided improved means for remotely controlling at will the operation of a circuit interrupter that is part of a bus duct plug-in unit that is mounted to tap power off of the bus duct. There is also provided a circuit interrupter having a solenoid operating device operable by automatically operable relay means to open the interrupter. Each of the relays includes a readily removable heater element that can be interchanged with any one of a number of heater elements of different sizes, thereby permitting adjustment of the thermal opening operation. The interrupting device, therefore, can be used to protect a variety of motors having different ratings. Since the operating device operates the circuit interrupter handle to open and close the breaker, and since the thermal operation of each of the overload relays can be adjusted without interfering with the internal mechanism of the circuit interrupter, many of the standard circuit interrupters presently on the market can be used in conjunction with the present invention.

The device of this invention performs the functions of a combination motor starter which has in the past comprised a manually operated fused switch or a circuit breaker combined with an electromagnetic contactor controlled by overload relays, but the cost has been greatly reduced by eliminating the expensive contactor. This has been done by providing the relatively inexpensive electric operator for working the handle of the breaker or switch under control of the overload relays and also under control of the push buttons or control switch for opening and closing the circuit at will. At the same time, the thermal and/or magetic trip device of the circuit breaker provides branch circuit protection against heavy overloads or short circuits. Thus, the circuit breaker of this invention may be opened under abnormal conditions either through release of the trip latch, operated thermally or magnetically, or by electric operation of the handle in response to a thermal relay. The device of this invention has the further advantage over the combination starters formerly used in that it is not necessary to manually operate the handle of the breaker after a tripping operation to reset the trip latch, since the electric operator is used to relatch the trip latch either automatically by a switch responsive to a tripping operation of the breaker or by a manually operated switch or push button. This avoids any need for operating the breaker through pull cords or a hook stick where the device is mounted at a height such as on bus duct.

The overload relays specifically described herein are mounted away from the motor and they are responsive to the amount of current flowing therethrough. For certain applications, the relay means could be operated by a device mounted in close proximity to the motor and responsive to the amount of heat generated in the motor to effect closing of the relay contacts and opening of the circuit breaker controlled thereby.

Having disclosed the invention in accordance with the provisions of patent statutes, it is to be understood that various changes and modifications may be made in the structural details thereof without departing from the spirit of the invention.

I claim as my invention:

1. Electric power distribution apparatus including, in combination, bus duct comprising a housing and a plurality of bus bars supported within the housing, a plug-in unit supported on the housing and connecting an electric circuit to the bus bars, said plug-in including an enclosure, a unitary circuit interrupter supported within said enclosure and comprising an operating handle operable to open and close said electric circuit, a unitary solenoid operating device supported within said enclosure adjacent the circuit interrupter, means operatively connecting said unitary solenoid operating device with said operating handle, said unitary solenoid operating device comprising a pair of solenoid coils and armature means movable in opposite directions upon alternate energization of the solenoid coils to effect operation of the circuit interrupter to open and close said electric circuit, and means operable from a location remote from said plug-in unit to effect alternate energization of said solenoid coils.

2. Electric apparatus including, in combination, bus duct comprising a housing and a plurality of bus bars supported within the housing, a plug-in unit supported on the housing and connecting an electric circuit to the bus bars, a motor energized to operate when said electric circuit is closed, the plug-in unit including a unitary circuit interrupter comprising an operating handle operable between two operating positions to open and close said electric circuit, the plug-in unit including a unitary solenoid operating device supported adjacent the circuit interrupter, means operatively connecting said unitary solenoid operating device with said operating handle, said unitary solenoid operating device being operable to operate the circuit interrupter to open and close said electric circuit, relay means automatically operable upon the occurrence of an overload current in said electric circuit above a predetermined amount to effect operation of the solenoid operating device to open the circuit interrupter, and an electric switch operable from a location remote from the plug-in unit to effect operation of the solenoid operating device to open and close the circuit interrupter.

3. In combination, a circuit interrupter having a handle movable to a first position to open an electric circuit and movable to a second position to close the circuit, solenoid operating means supported adjacent the circuit interrupter, the solenoid operating means comprising a pair of solenoid coils and armature means movable in opposite directions upon alternate energization of the solenoid coils to move said handle to operate the circuit interrupter, means operable manually from a location remote from the circuit interrupter to effect alternate energization of the solenoid coils, and relay means operable automatically upon the occurrence of certain abnormal conditions in said circuit to effect operation of the solenoid operating means to move said handle to said first position to open said circuit.

4. Electric power distribution apparatus including, in combination, bus duct comprising a housing and a plurality of bus bars supported within the housing, a plug-in unit supported on the housing and connecting an electric circuit to the bus bars, said plug-in unit including an enclosure, a circuit interrupter supported within the enclosure and comprising an operating handle movable between two operating positions to open and close said electric circuit, solenoid operating means supported within the enclosure, means operatively connecting said solenoid operating means with said operating handle, said solenoid operating means comprising a pair of solenoid coils and armature means movable in opposite directions upon alternate energization of the solenoid coils to effect operation of the circuit interrupter, switch means disposed in a position remote from said plug-in unit and operable to effect alternate energization of the solenoid coils, and overload relay means supported within the enclosure and operable automatically upon the occurrence of a predetermined overload current in said circuit to effect operation of the solenoid operating means to effect opening of said circuit.

5. In electric power distribution apparatus of the type comprising a bus duct housing and a plurality of bus bars supported within said housing, a plug-in unit comprising an enclosure, a circuit interrupter supported within said enclosure, contact members adapted to electrically connect said circuit interrupter to said bus bars, said circuit interrupter comprising an insulating housing, contacts disposed within said insulating housing and operable to open and close an electric circuit, an operating handle extending from said insulating housing and movable between spaced operating positions to open and close said contacts, solenoid operating means disposed adjacent said circuit interrupter and within said enclosure, means operatively connecting said solenoid operating means to said operating handle, switch means operable from a position remote from said plug-in unit to operate said solenoid operating means to move said operating handle to open and close said contacts, and means automatically operable upon the occurrence of certain abnormal current conditions to operate said solenoid operating means to move said operating handle to open said contacts.

6. In electric power distribution apparatus of the type comprising a bus duct housing and a plurality of bus bars supported within said housing, a plug-in unit comprising an enclosure, a circuit interrupter supported within said enclosure, contact members protruding from said enclosure and adapted to electrically connect said circuit interrupter to said bus bars, said circuit interrupter comprising an insulating housing, contacts disposed within said insulating housing and operable to open and close an electric circuit, an operating mechanism disposed within said insulating housing, means latching said operating mechanism in a normal position, an operating handle extending from said insulating housing and movable between spaced operating positions to open and close said contacts, trip means disposed within said insulating housing and being operable automatically upon the occurrence of certain abnormal conditions in said circuit to unlatch said operating mechanism, said operating mechanism when unlatched operating to open said contacts, said operating handle being operable to relatch said operating mechanism after said automatic opening operation, solenoid operating means supported adjacent said housing and within said enclosure, means operatively connecting said solenoid operating means to said operating handle, switch means manually operable from a position remote from said enclosure to operate said solenoid operating means to operate said handle to relatch said operating mechanism in said normal position after said automatic opening operation, said switch means being manually operable from said remote position to operate said solenoid operating means to operate said handle to open and close said contacts when said operating mechanism is latched in said normal position, and means automatically operable upon the occurrence of certain abnormal conditions in said circuit to operate said solenoid operating means to move said operating handle to open said contacts.

7. In electric power distribution apparatus of the type comprising a bus duct housing and a plurality of bus bars supported within said housing, a plug-in unit comprising an enclosure, a circuit interrupter supported within said enclosure, contact members adapted to electrically connect said circuit interrupter to said bus bars, said circuit interrupter comprising an insulating housing, a pair of contacts disposed within said insulating housing and operable to open and close an electric circuit, an operating mechanism disposed within said insulating housing, means latching said operating mechanism in a normal position, an operating handle extending from said insulating housing and being movable between spaced operating positions to open and close said contacts, trip means disposed within said insulating housing, said trip means comprising a first bimetal member operable automatically upon the occurrence of overload currents below a predetermined amount in said circuit to unlatch said operating mechanism after a time delay, said trip means comprising an electromagnetic device operable automatically upon the occurrence of overload currents above said predetermined amount in said circuit to immediately unlatch said operating mechanism, said operating mechanism when unlatched operating to open said contacts, said operating handle being operable to relatch said operating mechanism in said normal position after an automatic opening operation, solenoid operating means supported adjacent said circuit interrupter and within said enclosure, means operatively connecting said solenoid operating means to said operating handle, switch means operable from a position remote from said enclosure, said switch means being manually operable to operate said solenoid operating means to operate said handle to relatch said operating mechanism after an automatic opening operation, said switch means being manually operable to operate said solenoid operating means to operate said handle to open and close said contacts when said operating mechanism is latched in said normal position, and means comprising a second bimetal member automatically operable upon the occurrence of certain abnormal current conditions in said circuit to operate said solenoid operating means to move said operating handle to open said contacts when said operating mechanism is latched in said normal position.

8. In combination, a circuit interrupter comprising an insulating housing, a pair of contacts disposed within said housing and operable to open and close an electric circuit, trip means disposed within said housing and automatically operable upon the occurrence of certain abnormal conditions in said circuit to effect opening of said contacts, an operating handle extending from said housing and movable between spaced operating positions to open and close said contacts, solenoid operating means disposed adjacent said housing and operatively connected to said operating handle, and means automatically operable upon the occurrence of certain abnormal conditions in said circuit to operate said solenoid operating means to move said operating handle to open said contacts.

9. In combination, a circuit interrupter comprising an insulating housing, a pair of contacts disposed within said housing and operable to open and close an electric circuit, trip means disposed within said housing and automatically operable upon the occurrence of certain abnormal conditions in said circuit to effect opening of said contacts, an operating handle extending from said housing and movable between spaced operating positions to open and close said contacts, solenoid operating means disposed externally of said housing, means operatively connecting said solenoid operating means to said operating handle, switch means manually operable from a position remote from said solenoid operating means to operate said solenoid operating means to move said operating handle to open and close said contacts, and means operable automatically upon the occurrence of certain abnormal conditions in said circuit to operate said solenoid operating means to move said operating handle to open said contacts.

10. In combination, a circuit interrupter comprising an insulating housing, a pair of contacts disposed within said housing and operable to open and close an electric circuit, an operating mechanism disposed within said housing, means disposed within said housing latching said operating mechanism in a normal position, an operating handle extending from said housing and being movable between spaced operating positions to open and close said contacts, trip means disposed within said housing and being operable automatically upon the occurrence of certain abnormal conditions in said circuit to unlatch said operating mechanism, said operating mechanism when unlatched operating to open said contacts, said operating handle being operable to relatch said operating mechanism after said automatic opening operation, solenoid operating means supported adjacent said housing, means operatively connecting said solenoid operating means to said operating handle, switch means, said switch means being manually operable to operate said solenoid operating means to operate said handle to relatch said operating mechanism in said normal position after said automatic opening operation, said switch means being manually operable to operate said solenoid operating means to operate said handle to open and close said contacts when said operating mechanism is latched in said normal position, and means automatically operable upon the occurrence of certain abnormal conditions in said circuit to operate said solenoid operating means to move said operating handle to open said contacts.

11. In combination, a circuit interrupter comprising an insulating housing, a pair of contacts disposed within said housing and operable to open and close an electric circuit, an operating mechanism disposed within said housing, means disposed within said housing and latching said operating mechanism in a normal position, an operating handle extending from said housing and being movable between spaced operating positions to open and close said contacts when said operating mechanism is latched in said normal position, trip means disposed within said housing, said trip means comprising a first bimetal member operable automatically upon the occurrence of an overload current below a predetermined amount to unlatch said operating mechanism after a time delay, said trip means comprising an electromagnetic device operable automatically upon the occurrence of an overload current above said predetermined amount to immediately unlatch said operating mechanism, said operating mechanism when unlatched operating to open said contacts, said operating handle being operable to relatch said operating mechanism in said normal position after an automatic opening operation, solenoid operating means supported adjacent said housing, means operatively connecting said solenoid operating means to said operating handle, switch means, said switch means being manually operable to operate said solenoid operating means to operate said handle to relatch said operating mechanism in said normal position after an automatic opening operation, said switch menas being manually operable to operate said solenoid operating means to operate said handle to open and close said contacts when said operating mechanism is latched in said normal position, and means comprising a second bimetal member automatically operable upon the occurrence of certain abnormal conditions in said circuit to operate said solenoid operating means to move said operating handle to open said contacts when said operating mechanism is latched in said normal position.

References Cited by the Examiner

UNITED STATES PATENTS

| | | | |
|---|---|---|---|
| 1,476,777 | 12/23 | Taeubert. | |
| 1,563,062 | 11/25 | Barker | 200—172 |
| 1,683,132 | 9/28 | Hall | 200—172 |
| 1,900,595 | 3/33 | Weber | 317—120 |
| 1,962,033 | 6/34 | Reichold. | |
| 2,202,535 | 5/40 | Pedatella | 200—87 |
| 2,361,179 | 10/44 | De Mask | 317—120 |
| 2,448,470 | 8/48 | Rypinski | 317—41 |
| 2,458,151 | 1/49 | Dorfman. | |
| 2,601,638 | 6/52 | Rypinski. | |
| 2,733,313 | 1/56 | Rapizzi. | |
| 2,734,963 | 2/56 | Ardia. | |
| 2,760,035 | 8/56 | Friesen. | |
| 2,780,694 | 2/57 | Taylor | 317—58 X |
| 2,967,981 | 1/61 | Wise | 317—124 |
| 2,979,624 | 4/61 | Askerneese | 307—147 X |
| 3,003,084 | 10/61 | Wilkinson | 317—99 |

SAMUEL BERNSTEIN, *Primary Examiner.*